United States Patent
Baer et al.

(10) Patent No.: US 11,174,906 B2
(45) Date of Patent: Nov. 16, 2021

(54) METHOD FOR OPERATING A CLUTCH OF A MOTOR VEHICLE, AND MOTOR VEHICLE

(71) Applicant: AUDI AG, Ingolstadt (DE)

(72) Inventors: Michael Baer, Ingolstadt (DE); Martin Arndt, Ingolstadt (DE); Christian Graf, Ingolstadt (DE); Michael Wein, Seubersdorf (DE); Marc Baur, Ingolstadt (DE); Stefan Lehner, Ingolstadt (DE); Stefan Huefner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 487 days.

(21) Appl. No.: 16/321,568

(22) PCT Filed: Jul. 26, 2017

(86) PCT No.: PCT/EP2017/068943
§ 371 (c)(1),
(2) Date: Jan. 29, 2019

(87) PCT Pub. No.: WO2018/024582
PCT Pub. Date: Feb. 8, 2018

(65) Prior Publication Data
US 2021/0277965 A1    Sep. 9, 2021

(30) Foreign Application Priority Data
Aug. 4, 2016   (DE) .................... 10 2016 214 421.9

(51) Int. Cl.
*F16D 48/06*   (2006.01)
*B60K 17/348*  (2006.01)
(Continued)

(52) U.S. Cl.
CPC ............ *F16D 48/06* (2013.01); *B60K 17/348* (2013.01); *B60K 23/02* (2013.01); *F16D 13/52* (2013.01);
(Continued)

(58) Field of Classification Search
CPC ....... F16D 38/06; F16D 13/52; B60K 17/348; B60K 23/02
See application file for complete search history.

(56) References Cited

U.S. PATENT DOCUMENTS 3,535,004 A * 10/1970 Howard ................ B60T 8/1764
                                                      303/169
4,669,569 A    6/1987 Suzuki et al.
(Continued)

FOREIGN PATENT DOCUMENTS

CN    103153675 A    6/2013
CN    105082989 A    11/2015
(Continued)

OTHER PUBLICATIONS

International Preliminary Report on Patentability (Chapter 1) dated Feb. 14, 2019, of corresponding International application No. PCT/EP2017/068943; 6 pages.
(Continued)

*Primary Examiner* — Tinh Dang
(74) *Attorney, Agent, or Firm* — Maier & Maier, PLLC

(57) ABSTRACT

A method for operating a clutch of a drive train of a vehicle wherein the clutch, a drive motor primary axis having first wheels that can be driven by the drive motor as first axis and a second axis having second wheels are driven by the drive motor via the clutch as second axis, with the clutch being adjusted between a closed position, wherein a first coupling torque of the clutch is set, and at least one second position differing from the closed position, wherein a second cou-
(Continued)

pling torque of the clutch that is lower than the first coupling torque is set: determining at least one coefficient of friction of a roadway the vehicle is located on; and as a factor of the determined coefficient of friction: adjusting a basic torque of the clutch, with the clutch being prestressed in the second position by the basic torque.

9 Claims, 1 Drawing Sheet

(51) Int. Cl.
*B60K 23/02* (2006.01)
*F16D 13/52* (2006.01)
(52) U.S. Cl.
CPC .............. *F16D 2500/10431* (2013.01); *F16D 2500/3102* (2013.01); *F16D 2500/3109* (2013.01); *F16D 2500/3115* (2013.01); *F16D 2500/3125* (2013.01)

(56) References Cited

U.S. PATENT DOCUMENTS

| | | | | |
|---|---|---|---|---|
| 4,781,265 A | * | 11/1988 | Weiler | B60K 23/08 180/197 |
| 4,951,198 A | * | 8/1990 | Watanabe | B62D 7/159 180/415 |
| 2005/0121247 A1 | | 6/2005 | Murakami et al. | |
| 2011/0035130 A1 | | 2/2011 | Noguchi et al. | |

FOREIGN PATENT DOCUMENTS

| | | |
|---|---|---|
| CN | 105307891 A | 2/2016 |
| DE | 19838169 A1 | 3/1999 |
| DE | 102006061249 A1 | 6/2008 |
| DE | 102009009264 A1 | 9/2009 |
| DE | 102010047443 A1 | 4/2012 |
| DE | 102011080716 A1 | 4/2012 |
| DE | 102012222197 A1 | 6/2014 |
| JP | 2002012160 A | 1/2002 |
| WO | 2015/054368 A1 | 4/2015 |

OTHER PUBLICATIONS

Chinese Office Action dated May 26, 2021, in connection with corresponding CN Application No. 201780049365.5 (11 pp., including machine-generated English translation).
Examination Report dated Mar. 10, 2017 of corresponding German application No. 10 2016 214 421.9; 10 pages.
International Search Report and Written Opinion of the International Searching Authority dated Dec. 6, 2017 in corresponding International application No. PCT/EP2017/068943; 24 pages.

* cited by examiner

METHOD FOR OPERATING A CLUTCH OF A MOTOR VEHICLE, AND MOTOR VEHICLE

FIELD

The invention relates to a method for operating a clutch of a vehicle as well as a vehicle with a drive train.

BACKGROUND

Such methods for operating clutches of vehicles are already well known from the general art and particularly from series vehicle construction. In this, the respective clutch is part of a respective drive train, by means of which the respective vehicle may be driven. Thus, the drive train comprises the clutch, as well as a drive motor, which may be designed as an internal combustion engine, for instance. Furthermore, the drive train comprises a primary axis, with this axis being a first axis and it also being possible to refer to this axis as the first axis, and first wheels. In this, the first wheels can be driven by the drive motor.

Furthermore, the drive train comprises a secondary axis spaced apart from the primary axis in a longitudinal direction of the vehicle, with the secondary axis having second wheels. The secondary axis is also referred to as second axis and is a second axis of the drive train, respectively, with the second wheels being drivable by the drive motor via the clutch. For example, the primary axis is a front axis such that the first wheels are front wheels. In this, the secondary axis, for example, is a rear axis disposed behind the front axis in a longitudinal direction of the vehicle such that the second wheels are rear wheels, for example.

Within the framework of the respective method, the respective clutch is adjusted between a closed position and at least one second position differing from the closed position. In the closed position, the axes are coupled to one another via the clutch. In other words, the clutch couples the axes to one another in the closed position of the clutch. In so doing, a first coupling torque of the clutch is set in the closed position. In the second position differing from the closed position, the clutch couples the axes to one another to a lower extent than in the closed position. Thus, a second coupling torque of the clutch is set in the second position that is lower than the first coupling torque. For example, in order to set the clutch from the closed position to the second position, the clutch is opened at least partially. In the closed position, the clutch is capable of transferring a first torque at most, for example, such that the first torque can be transmitted between the axes via the clutch at most. In the second position differing from the closed position, the clutch may, for example, transmit a second torque at most, with the second torque being lower than the first torque, such that the second torque can be transmitted between the axes via the clutch in the second position at most. As a consequence, the lower coupling torque of the clutch is set in the second position, when compared to the closed position.

US 2005/0121247 A1 discloses a method for operating a drive train of a vehicle, within the framework of which a clutch, the connection force of which being variable, is provided between a front axis and a rear axis. Within the framework of the method, the vehicle may be operated in a traditional mode and in an anti-vibration mode.

DE 10 2010 047 443 A1 discloses a vehicle with a four-wheel drive system, within the framework of which the front axis and the rear axis of the vehicle can be driven with differently dimensioned front axis and rear axis torques, with a torque differential between the front axis and rear axis torques resulting in a speed differential between a speed on the front axis and a speed on the rear axis. Furthermore, it is provided that the vehicle comprises a unit for determining a coefficient of friction, with the unit capturing the speed differential. Based on a pair of values consisting of the speed differential and the torque differential and/or of parameters correlating therewith, the unit determines the coefficient of friction of the road.

Furthermore, DE 10 2009 009 264 A1 discloses a power transmission device for distributing a drive force output by a transmission system to a main drive gear and an auxiliary drive gear. The objective of the present invention is to further develop a method and a vehicle of the type mentioned above in such a way that a particularly comfortable vehicle operation can be implemented.

SUMMARY

A first aspect of the invention relates to a method for operating a clutch of a vehicle, particularly a car, for example a passenger car. In so doing, the clutch is part of a drive train of the vehicle, which may be driven via the drive train. Thus, the drive train comprises the clutch and a drive motor, with this motor possibly being designed as an internal combustion engine or as electronic machine and electronic motor, respectively.

The drive train comprises a primary axis having first wheels, which can be driven by the drive motor. The primary axis is a first axis of the drive train and is also referred to as first axis, respectively. The drive train further comprises a secondary axis spaced apart from the primary axis in a longitudinal direction of the vehicle having second wheels. The secondary axis is a second axis of the drive train and is also referred to as second axis. In so doing, the second wheels can be driven by the drive motor via the clutch.

For example, the primary axis is a front axis such that the first wheels are front wheels. In this, a secondary axis, for example, is a rear axis disposed behind the front axis in a longitudinal direction of the vehicle such that the second wheels are rear wheels, for example. Thus, the rear axis is designed as a so-called hang-on rear axis, for example. Alternatively, it is thinkable that the rear axis is the primary axis and the front axis is the secondary axis such that the front axis is designed as a so-called hang-on front axis.

Within the framework of the method, the clutch is adjusted between a closed position and at least one second position differing from the closed position. In the closed position, the axes are coupled to one another via the clutch. In this, a first coupling torque of the clutch is set in the closed position. In the second position, the clutch couples the axes to one another using a lower force than in the closed position. In this, a second coupling torque of the clutch is set in the second position, with this being lower than the first coupling torque. For example, in order to set the clutch from the closed position to the second position, the clutch is opened at least partially. This means that, for example, in the closed position of the clutch, the axes are coupled to one another via the clutch using a higher force than in the second position of the clutch such that the axes, in the second position of the clutch, are coupled to one another via the clutch using less force than in the closed position of the clutch. For example, the clutch may transmit a first torque in the closed position at most such that, for example, the first torque may be transmitted between the axes via the clutch at most in the closed position of the clutch. In the second position, the clutch may transmit a second torque at most that is lower than the first torque such that, for example, the second torque that is lower than the first torque may be transmitted between the axes via the clutch in the second position of the clutch. Thus, a lower coupling torque of the clutch is set in the second position, when compared to the first position.

In order to be able to implement a particularly comfortable operation of the drive train and thus of the vehicle as a whole, the method comprises a first step according to the invention, within the framework of which at least one coefficient of friction of a roadway the vehicle is located on is determined. For example, the coefficient of friction is determined using an electronic computing device, particularly of the vehicle, with the electronic computing device also being referred to as controller.

According to the invention, the method further comprises a second step, within the framework of which, as a factor of the determined coefficient of friction, particularly using the electronic computing device, a basic torque of the clutch is set, with the clutch being prestressed by the basic torque in the second position. This means that the clutch, in the second position, is opened incompletely, i.e. the clutch is closed in the second position, with the clutch, in the second position, being closed to a lower extent than in the closed position. As a result, the axes are coupled to one another via the clutch both in the closed position and in the second position of the clutch, with the axes, in the second position, being coupled to one another via the clutch using a lower force than in the closed position. Thus, only the first torque differing from zero and being higher than the second torque at most may be transmitted via the clutch to the axis in the closed position, for example. In the second position, the second torque differing from zero and being lower than the first torque may be transmitted at most between the axes via the clutch. Thus, a first coupling torque of the clutch differing from zero is set in the closed position, for example, with, in the second position, a second coupling torque differing from zero and being lower than the first coupling torque being set. In this, the second coupling torque is the basic torque, for example, differing from zero and being lower than the first coupling torque that is set in the closed position of the clutch.

Based on the basic torque differing from zero, the clutch is prestressed in the second position such that, for example, the clutch can be closed particularly quickly, particularly farther based on the second position such that the clutch, for example based on the second position, can be set to the closed position particularly quickly.

In this, the invention is based on the idea of not using any constant basic torque for prestressing the clutch in the second position, but, according to the invention, the basic torque is varied as a factor of the determined coefficient of friction. As a consequence, vibrations and oscillations, respectively, of the drive train, particularly when turning and thus when the vehicle is driven through a bend, may be avoided or at least minimized, for example, such that a particularly high traveling comfort, particularly for passengers of the vehicle, can be implemented.

In so doing, the drive train is designed as four-wheel drive train or as four-wheel system, with it being possible to switch between a two-wheel drive and a four-wheel and/or all-wheel drive, as required, using the clutch. If the primary axis is the front axis, the two-wheel drive is a front-wheel drive. If the primary axis is the rear axis, the two-wheel drive is a rear-wheel drive.

In order to set the four-wheel and/or all-wheel drive, the clutch is closed and set to its closed position, respectively, for example, such that both the first wheels and the second wheels can be and are, respectively, driven by the drive motor, particularly during traction mode of the drive motor. In order to implement the two-wheel drive, the clutch, for example based on the closed position, is moved to the second position and thus opened, with the clutch preferably not being opened completely, but being prestressed in the second position by the basic torque. As a consequence, for example referring to the wheels, only the first wheels are driven by the drive motor and the second wheels, respectively, particularly in traction mode of the drive motor, are driven less than when setting the four-wheel and all-wheel drive, respectively, via the clutch. Since the basic torque is not zero, the axes, in the second position of the clutch, are coupled to one another via the clutch, for example, with the axes being coupled to one another via the clutch using less force when compared to the closed position, however.

It was found out that for clutch-based all-wheel systems, particularly when turning and thus when driving through bends, there is a strong vibration tendency during speed compensation of the axis moving along different curve radii, for example. Furthermore, there may be a target conflict between implementing advantageous acoustics and implementing an advantageous traction, because in order to implement an advantageous traction, a strong coupling of the axis is desired to be effected by means of the clutch. In order to implement the strong coupling of the axes, the drive train, for example, is over-pressed and operated in an over-pressed condition, respectively, within the framework of which the clutch, in its closed position, is closed, particularly compressed, with such a force, that there are no differential speeds and no slippage, respectively, in the clutch and between the axes.

However, in order to implement advantageous acoustics, only a low coupling to be effected by the clutch is desired, particularly when turning at low speeds, because the vibration tendency is particularly strong in these situations.

In order to mitigate and resolve, respectively, this target conflict, the basic torque is set as a factor of the determined coefficient of friction, whereby a situation-adaptive torque cap may be implemented. Thus, it is possible, for example, to be able to implement, depending on the driving situation, particularly as a factor of the coefficient of friction, a strong coupling of the axes via the clutch and thus a particularly good traction or only a low coupling of the axes and thus particularly advantageous acoustics of the drive train. In this, the method according to the invention is more advantageous when compared to such torque caps and torque reductions, respectively, with these being based on stationary steering angle-dependent maximum torques that are disabled during kick-down, for example. It was found out that torque reductions based on stationary steering angle-dependent maximum torques may result in unacceptable traction properties, particularly when turning, due to low basic torques. This disadvantage and this issue, respectively, may be prevented using the method according to the invention. Using the method according to the invention, it is thus possible to ensure all-wheel and four-wheel properties, respectively, and thus an advantageous traction even in an efficiency-optimized and thus space- and weight-favorably designed drive train, with it being possible to simultaneously avoid excessive vibrations and resulting excessive comfort impairments.

For example, the coefficient of friction of the roadway is determined, particularly estimated, on the basis of a stability assessment of at least one of the wheels. If, for example, within the framework of the stability assessment it is determined that at least one wheel reaches its traction limit at one point in time, for example, which may be characterized and illustrated, respectively, by the circle of forces, or exceeds the traction limit, accelerations, particularly longitudinal and transverse acceleration, affecting the vehicle at that point in time are determined. Based on the accelerations, particularly by vector addition of force vectors of the longitudinal and transverse acceleration, conclusions can be made regarding the coefficient of friction. In so doing, the sum of the vector addition is the radius of the circle of forces and a measure for the coefficient of friction of the roadway, for example. For example, a difference between the speed of the at least one wheel and the speed of at least another one of the wheels may be used to determine that the at least one wheel reaches or exceeds its traction limit.

In order to be able to implement a particularly high traveling comfort, one embodiment of the invention provides that the basic torque of the clutch is set as a factor of the steering angle of the vehicle. For example, the wheels of at least one of the axes, particularly the front wheels, are designed as steered or steerable wheels, which, in order to drive the vehicle through bends and to turn the vehicle, respectively, may be swiveled around a steering axis, whereby different steering angles of the steerable wheels and thus of the vehicles may be set. By taking into consideration the steering angle when setting the basic torque, the basic torque may be adapted to the steering angle and thus to driving through bends and turning, respectively, as required such that a particularly advantageous situation-adaptive torque cap may be implemented.

As a consequence, excessive vibrations of the drive train, particularly when turning at low speeds, may be avoided.

In order to be able to set the basic torque particularly in line with the demand, another embodiment of the invention provides that a speed of at least one of the wheels, particularly using a rotational speed sensor, is determined, with the coefficient of friction being determined as a factor of the speed determined. As a consequence, the coefficient of friction may be determined, particularly estimated, particularly accurately such that, as a consequence, the basic model can be adapted and adjusted, respectively, in a particularly advantageous manner.

Another embodiment is characterized in that the coefficient of friction is determined as a factor of a steering angle of the vehicle. As a consequence, the coefficient of friction may be determined particularly accurately such that the basic torque may be set in a way that it is adapted to the situation. As a result, a particularly high traveling comfort may be implemented.

In another embodiment of the invention, at least one acceleration affecting the vehicle, particularly using at least an acceleration sensor, is determined, with the coefficient of friction being determined as a factor of the acceleration determined. As a consequence, the coefficient of friction may be determined and estimated, respectively, particularly accurately such that, as a result, the basic torque can be adapted to the coefficient of friction and thus to the respective driving situation in a manner particularly in line with the demand.

In a particularly advantageous embodiment of the invention, the coefficient of friction is determined as a factor of a yaw rate of the vehicle, whereby the coefficient of friction may be determined and estimated, respectively, particularly advantageously and accurately.

In another embodiment of the invention, an electronic computing device of the vehicle uses at least one computational model in order to compute an expected behavior, particularly drivability, of the vehicle, with the coefficient of friction being determined as a factor of the behavior computed. As a result, the basic torque may be adapted to respective driving situations particularly well such that the above-mentioned target conflict may be mitigated or resolved.

In another embodiment of the invention, a frictionally engaged clutch is used as the clutch, with the frictionally engaged clutch, for example, being designed as multi-plate clutch. The frictionally engaged clutch, which is also referred to as friction clutch, comprises at least two friction partners that may be used, particularly depending on the position of the clutch, in order to transmit torques such that the second wheels may be driven by the drive motor via the friction partners. In order to set the respective coupling torques described above, the friction partners are pressed against one another with a respective clamping force, for example. For example, the clamping force may be effected hydraulically, pneumatically or electrically and electromechanically, respectively. In order to set the first coupling element, the friction partners are pressed against one another using a first clamping force, for example, with, in order to implement the second coupling element, the friction partners being pressed against one another using a second clamping force that is lower than the first clamping force, for example. Thus, the friction partners are pressed against one another in the second position, but with a lower force than in the closed position such that the clutch is prestressed in the second position.

By using the frictionally engaged clutch, particularly the multi-plate clutch, the clutch may be switched between the second position and the closed position in a manner particularly in line with the demand, whereby it is possible to switch between the two-wheel and front or rear axis drive, respectively, and the four-wheel and all-wheel drive, respectively, in a manner particularly in line with the demand. In particular, using a frictionally engaged clutch, particularly a multi-plate clutch, it is possible to be able to set the basic torque particularly easily and in a manner particularly in line with the demand such that a particularly high traveling comfort may be implemented.

A second aspect of the invention relates to vehicle that is designed as a car, particularly a passenger car, for example, having a drive train that is designed in order to implement a method according to the invention. Advantages and advantageous embodiments of the first aspect of the invention shall be deemed advantages and advantageous embodiments of the second aspect of the invention and vice versa.

Additional advantages, features and details of the invention result from the following description of a preferred exemplary embodiment, as well as based on the drawing. The features and combinations of features mentioned above in the description, as well as the features and combinations of features mentioned below in the description of the figures and/or indicated in the figures alone shall not only be used in the combination indicated in each case, but also in other combinations or alone, without deviating from the scope of the invention.

BRIEF DESCRIPTION OF THE DRAWINGS

The drawing shows in.

In the figures, identical elements or elements with identical functions have the same reference numerals.

DETAILED DESCRIPTION

Figure 1:
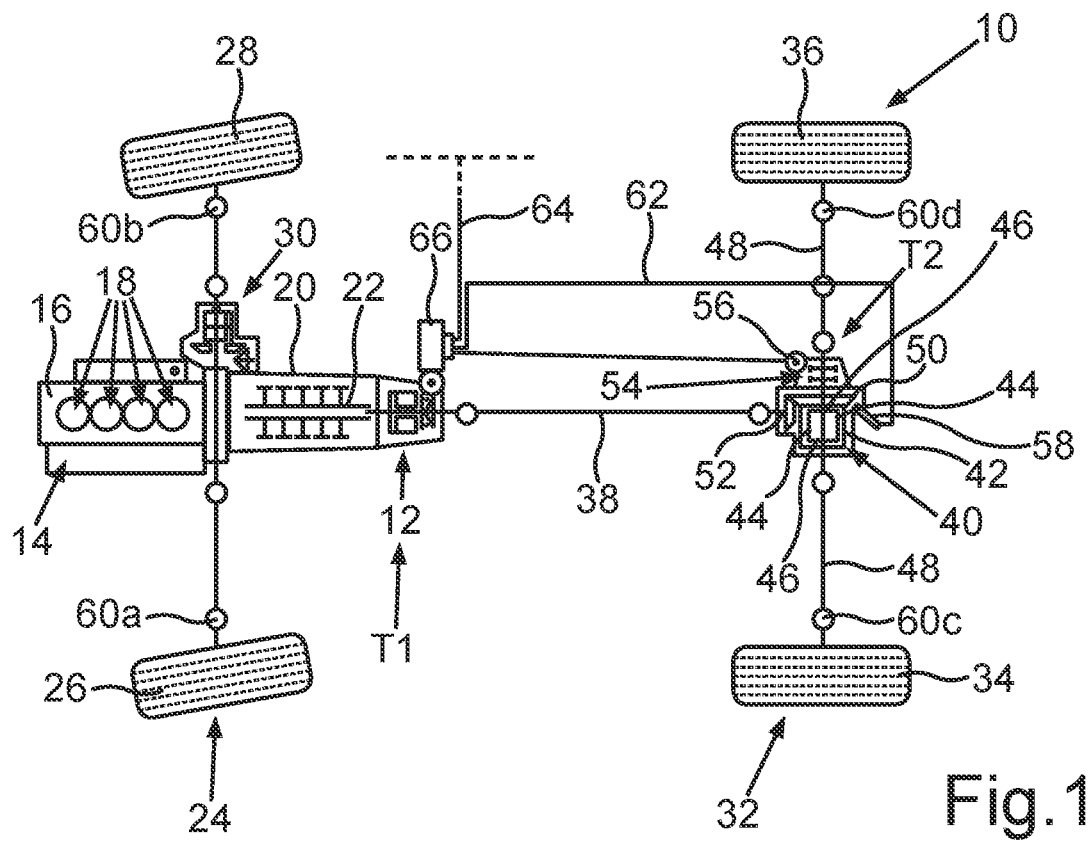
FIG. 1 a schematic representation of a drive train of a vehicle, with a basic torque of a clutch of the drive train being set as a factor of a determined coefficient of friction.

FIG. 1 is a schematic representation showing a drive train 10 for a vehicle, for example designed as a car, particularly as a passenger car. The drive train 10 comprises a clutch presently designed as multi-plate clutch 12, which is thus designed as a frictionally engaged and force-fitted, respectively, clutch. Furthermore, the drive train 10 comprises a drive motor 14 presently designed as an internal combustion engine and as a combustion engine, respectively. As an alternative, it is thinkable that the drive motor 14 is designed as electric machine and electric motor, respectively. In the exemplary embodiment illustrated in the figures, the drive motor 14 comprises a cylinder casing 16 forming combustion chambers in form of cylinders 18. Furthermore, the drive motor 14 comprises an output shaft not discernible in FIG. 1, with this shaft being rotatable around a rotational axis relative to the cylinder casing 16. For example, if the drive motor 14 is designed as reciprocating piston engine, the output shaft is designed as a crankshaft, for example. In the exemplary embodiment illustrated in the figures, the drive motor 14 is designed as lengthwise installed and lengthwise mounted, respectively, drive motor, with the rotational axis at least substantially being in a longitudinal direction of the vehicle.

The drive train 10 further comprises a transmission 20, comprising a transmission input shaft and a transmission output shaft 22 not discernible in FIG. 1, for example. For example, the transmission output shaft 22 may be driven by the transmission input shaft. For example, the transmission input shaft may be driven by the output shaft and thus by the drive motor 14 via a start-up element not shown in FIG. 1, for example, such that the transmission output shaft 22 may be driven by the output shaft and thus by the drive motor 14 via the transmission input shaft and the start-up element. In this, the multi-plate clutch 12 may be driven by the transmission output shaft 22 and thus via the transmission output shaft 22, the transmission input shaft and the start-up element by the output shaft and by the drive motor 14, respectively. For example, in a traction mode, the drive motor 14 provides torques for driving the vehicle using its output shaft. For example, the torques may be transmitted from the output shaft via the start-up element, the transmission input shaft and the transmission output shaft 22 to the multi-plate clutch 12 and introduced into the multi-plate clutch 12, whereby the multi-plate clutch 12 may be and is, respectively, driven.

The drive train 10 comprises a front axis 24 having front wheels 26 and 28. The front axis 24 is a primary axis and thus a first axis of the drive train 10 and is also referred to as first axis, respectively. The front wheels 26 and 28 thus are first wheels of the drive train 10 and are also referred to as first wheels, respectively. The front wheels 26 and 28 may be driven by the output shaft and thus by the drive motor 14, particularly via the start-up element. In this, the front axis 24 is characterized by a differential 30 also referred to as front axis transmission or front axis differential. In this, the front wheels 26 and 28 may be driven by the output shaft via the differential 30 and particularly via the start-up element. The differential 30 allows for a speed compensation between the front wheels 26 and 28, particularly when turning and when driving the vehicle through bends, respectively, such that the outer wheel may rotate faster than the inner wheel. In other words, the differential 30 allows for different speeds of the front wheels 26 and 28.

The drive train 10 further comprises a rear axis 32 having rear wheels 34 and 36 spaced apart from the primary axis in a longitudinal direction of the vehicle and thereby disposed behind the front axis 24 in a longitudinal direction of the vehicle. The rear axis 32 is a secondary axis and thus a second axis of the drive train 10 and is also referred to as second axis, respectively. In this, the rear wheels 34 and 36 are second wheels of the drive train 10 and the rear wheels 34 and 36 are also referred to as second wheels, respectively. In the exemplary embodiment illustrated in the figures, the rear axis 32 thus is designed as a hang-on rear axis that may be activated and deactivated in line with the demand. The previous and following information may be readily transferred to such an embodiment accordingly, within the framework of which the rear axis 32 is the primary axis and the front axis 24 is the secondary axis such that the front axis 24 in this case is designed as hang-on front axis and may be activated and deactivated in line with the demand.

The drive train 10 further comprises a shaft presently designed as a cardan shaft 38, with the rear wheels 34 and 36 being drivable via the cardan shaft 38 and via the multi-plate clutch 12 by the transmission output shaft 22 and thus by the transmission output shaft 22, the transmission input shaft and the start-up element by the output shaft and thus by the drive motor 14. In this, the rear axis 32 is characterized by a second differential 40 also referred to as rear axis differential or rear axis transmission. In this, the rear wheels 34 and 36 may be driven by the cardan shaft 38 via the differential 40, with the differential 40, particularly when turning and then driving the vehicle through bends, respectively, allowing different speeds of the rear wheels 34 and 36. In other words, the differential 40 allows for speed compensation between the rear wheels 34 and 36 such that, for example when driving through a bend, the outer wheel may rotate faster and with a higher speed, respectively, than the inner wheel.

The mode of operation and the design of the respective differential 30 and 40, respectively, are well known such that this shall only be addressed briefly taking the differential 40 as an example. As is well known, the differential 40 is characterized by a basket 42 having pivoted compensation gear 44. Furthermore, the differential 40 comprises driven gear 46 connected to half-shafts 48 of the rear axis 32 in a torque-proof manner. The rear wheels 34 and 36 may be driven via the half-shafts 48. Furthermore, the differential 40 comprises a crown wheel 50 connected to the basket 42 in a torque-proof manner, the wheel being used to drive the basket 42. The compensating gear 44 are engaged with the driven gears 46, with the compensating gear 44 and the driven gear 46 having respective teeth that are engaged with one another.

Furthermore, the drive train 10 comprises a bevel gear 52 connected to the cardan shaft 38 in a torque-proof manner that is engaged with the crown wheel 50. This means that the crown wheel 50 and the bevel gear 52 have respective tooth systems engaged with one another. As a consequence, the crown wheel 50 may be driven by the cardan shaft 38 via the bevel gear 52, for example. If the bevel gear 52 is used to drive the crown wheel 50 by the cardan shaft 38, the basket 42 is thereby driven by the crown wheel 50. As a consequence, the compensating gear 44 and via these the driven gear 46 are driven such that the half-shafts 48 and thereby the rear wheels 34 and 36 are driven.

Figure 2:
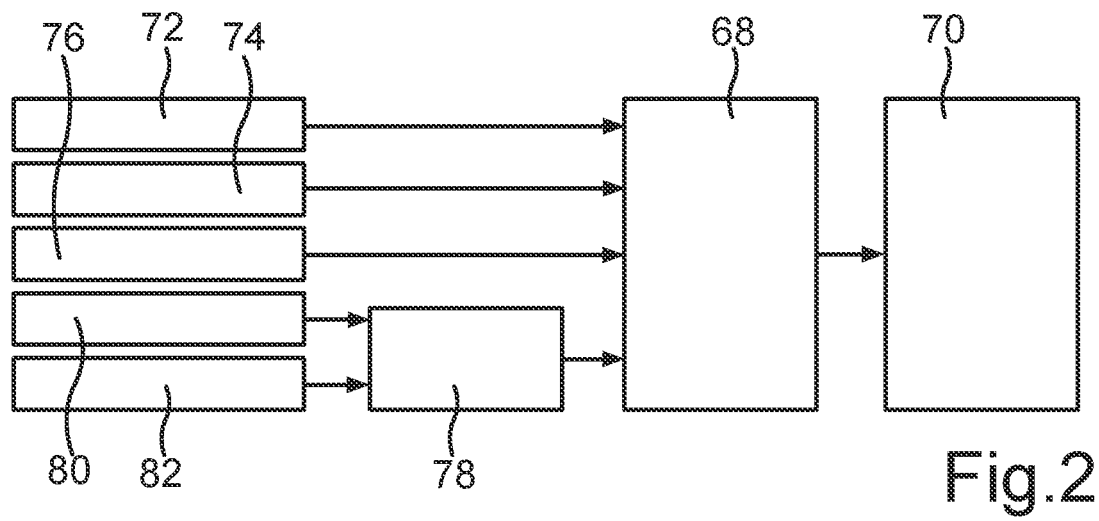
FIG. 2 a block diagram for illustrating a method for operating the clutch.

FIG. 2 shows that the multi-plate clutch 12 is used on a front, first separator T1. In other words, the multi-plate clutch 12 is used in order to implement the front, first separator T1.

On a rear, second separator T2 a positive fit coupling device presently designed as dog clutch 54 is being used. The dog clutch 54 can be adjusted between a coupled position and at least one decoupled position. In the coupled position, the rear wheels 34 and 36 are coupled in a positively fitting manner to the cardan shaft 38 via the dog clutch 54 such that, in the coupled position, torques may be transmitted between the rear wheels 34 and 36 and the cardan shaft 38 via the dog clutch 54 and/or such that, in the coupled position, the rear wheels 34 and 36 may be driven in a positively fitting manner via the dog clutch 54 by the cardan shaft 38. However, in the decoupled position, the rear wheels 34 and 36 are decoupled from the cardan shaft 38 such that, in the decoupled position of the dog clutch 54, the rear wheels 34 and 36 cannot be driven via the dog clutch 54 by the cardan shaft 38.

In this, the dog clutch 54 is integrated into the differential 40. Regarding a torque flow from the cardan shaft 38 to the rear wheels 34 and 36, the dog clutch 54 is disposed in such a way that the rear wheels 34 and 36, in the decoupled position of the dog clutch 54, are decoupled from the crown wheel 50, i.e. are not coupled via the dog clutch 54 to the crown wheel 50. The bevel gear 52 and the crown wheel 50 form an angle drive designed as 90-degree angle drive, with the rear wheels 34 and 36, in the coupled position of the dog clutch 54, being coupled to the angle drive in a positively fitting manner via the dog clutch 54 and, thus, being drivable by the angle drive via the dog clutch 54. However, in the decoupled position of the dog clutch 54, the rear wheels 34 and 36 are decoupled from the angle drive such that the rear wheels 34 and 36 cannot be driven via the dog clutch 54 by the angle drive.

In this, the dog clutch 54 comprises, for example, at least one coupling element that may be adjusted between the coupled position and the decoupled position. In this regard, an actuator 56 is provided that may be used in order to move the coupling element between the closed position and the open position, particularly in a translational manner.

For example, the cardan shaft 38 and the angle drive are part of a secondary drive train and form such a secondary drive train, respectively, that may be used in order to create a four-wheel and all-wheel drive, respectively, that is particularly favorable regarding installation space, weight, and cost. By using the separators T1 and T2 and thus the multi-plate clutch 12 and the dog clutch 54, switching between a two-wheel and front-wheel drive, respectively, and a four-wheel and all-wheel drive, respectively, can be implemented particularly in line with the demand, such that the drive train 10 is designed as all-wheel drive train and as all-wheel system, respectively. The all-wheel and four-wheel drive, respectively, is a first operating condition, with the two-wheel and front-wheel drive, respectively, being a second operating condition of the drive train 10 and of the vehicle, respectively. In order to implement the first operating condition, the multi-plate clutch 12 and the dog clutch 54 are closed such that the multi-plate clutch 12 is in its closed position and the dog clutch 54 is in its coupled position. If the drive motor 14 then is in traction mode, within the framework of which the drive motor 14 provides torques via its output shaft, both the front wheels 26 and 28 and the rear wheels 34 and 36 are driven by the output shaft and thus by the drive motor 14. In order to implement the second operating condition, the dog clutch 54 is opened and thus adjusted to its decoupled position. Furthermore, the multi-plate clutch 12 is opened at least partially and to a certain extent, respectively, and thus adjusted, for example, from its closed position to a second position differing from the closed position.

The closed position of the multi-plate clutch 12 serves for coupling the cardan shaft 38 via the multi-plate clutch 12 to the output shaft and thus for coupling the rear axis 32 to the front axis 24 via the multi-plate clutch 12. In other words, the axes are coupled to one another by the multi-plate clutch 12 in the closed position of the multi-plate clutch 12. In the second position of the multi-plate clutch 12 differing from the closed position, the multi-plate clutch 12 couples the axes with less force than in the closed position. In so doing, it is preferably provided that the multi-plate clutch 12, in the closed position, is not opened completely, but is closed, with it being closed to a less extent than in the closed position, however, such that the axes, in the second position of the multi-plate clutch 12, are coupled to one another via the multi-plate clutch 12, but to a less extent than in the closed position.

To that end, for example in order to implement the closed position, a first coupling torque of the multi-plate clutch 12 is set, with a second coupling torque of the multi-plate clutch 12 that is lower than the first coupling torque being set in order to implement the second position. As a consequence, the multi-plate clutch 12 may transmit a first torque at most in the closed position, with the multi-plate clutch 12 being able to transmit a second torque at most that is lower than the first torque in the second position.

Preferably, the multi-plate clutch 12 and thus the drive train 10 are over-pressed in the closed position of the multi-plate clutch 12 such that there are no differential speeds in the multi-plate clutch 12 and between the axes, respectively, i.e. such that there is no slippage in the multi-plate clutch 12 and between the axes, respectively. However, in der second position, there may be a slippage in the multi-plate clutch 12 and between the axes, respectively.

For example, the multi-plate clutch 12 comprises a plurality of discs, particularly friction discs, for example disposed behind one another and sequentially, respectively, in an axial direction of the multi-plate clutch 12. In order to implement the closed position and thus the first coupling torque, the discs of the multi-plate clutch 12, particularly in an axial direction of the multi-plate clutch 12, are pressed together by means of a first clamping force. In order to implement the second position, the discs of the multi-plate clutch 12, particularly in an axial direction of the multi-plate clutch 12, are pressed together by means of a second clamping force that is lower than the first clamping force. As a consequence, the second coupling torque is set as a so-called basic torque of the multi-plate clutch 12, with the clutch being prestressed by the basic torque (seconds coupling torque). Based on this prestressing of the multi-plate clutch 12 it is possible to close the multi-plate clutch 12 starting from the second position particularly quickly, particularly farther, and, for example, to move it to the closed position. Thus, such prestressing of the multi-plate clutch 12 is advantageous in order to engage quickly and thus to move the multi-plate clutch 12 from its second position to the closed position particularly quickly, avoiding excessive slippage between the axes.

The drive train 10 further comprises a first speed sensor 58, with the help of which a speed of a crown wheel 50 can be and is, respectively, measured. For example, the angle drive has one of 1 different gear ratios. Since the crown wheel 50 is coupled to the cardan shaft 38 via the bevel gear 52, the speed of the crown wheel 50 correlates with the speed of the cardan shaft 38, with the speed of the crown wheel 50 not necessarily having to correspond to the speed of the cardan shaft 38 from a value point of view. However, depending on the gear ratio of the angle drive, the speed of the cardan shaft 38 may be calculated taking the speed of the crown wheel 50 determined by the speed sensor 58 as the basis.

The drive train 10 comprises second speed sensors 60a-d, which are also referred to as wheel speed sensors. By means of the speed sensors 60a-d respective speeds of the wheels (front wheels 26 and 28 and rear wheels 34 and 36) can be measured. In other words, the second speed sensors 60a-d are used to measure respective speeds of the front wheels 26 and 28 and of the rear wheels 34 and 36.

For example, the first speed sensor 58 provides at least a first signal, particularly a first electronic signal, characterizing the speed measured by means of the speed sensor 58. For example, the respective speed sensor 60a-d provides at least a second signal, particularly at least a second electronic signal, characterizing the respective speed of the respective wheel measured by means of the respective speed sensor 60a-d. For example, the speed sensors 58 and 60a-d are connected to an electronic computing device 66 of the drive train 10 and thus of the vehicle via respective cables 62 and 64, with the electronic computing device 66 also being referred to as controller. The respective signals characterizing the respective speeds are transmitted from the speed sensors 58 and 60a-d via the cables 62 and 64 to the controller and received by the controller. For example, the cables 62 and 64 are part of a data bus system of the vehicle, with the data bus system also being referred to as data bus and, for example, being designed as CAN bus (CAN—Controller Area Network). The data bus is used to transmit the respective signals to the controller and to receive these by the controller.

The controller may actuate the dog clutch 54, particularly the actuator 56, and the multi-plate clutch 12 such that, as a consequence of such an actuation, the dog clutch 54 may be adjusted between the coupled position and the decoupled position and such that, as a consequence of such an actuation, the multi-plate clutch 12 may be adjusted between the closed position and the second position. Since the controller receives the signals mentioned, it is possible that the controller actuates and thus operates the dog clutch 54 and the multi-plate clutch 12 depending on the measured speeds such that, for example, the dog clutch 54 may be and is, respectively, adjusted between the decoupled position and the coupled position as a factor of at least one of the speeds. Alternatively or additionally, it is thinkable that the multi-plate clutch 12 is adjusted between the closed position and the second position as a factor of at least one of the measured speeds.

FIG. 2 shows a block diagram for illustrating a method for operating the drive train 10. Within the framework of a first step of the method illustrated by a block 68, particularly by means of the controller, at least one coefficient of friction of a roadway the vehicle is located on is determined. In other words, the vehicle is supported on the roadway via the wheels, with the vehicle, for example, driving along the roadway and thus rolling over the roadway via the wheels, at least one coefficient of friction of the roadway is determined within the framework of the first step. The coefficient of friction is also referred to as roadway coefficient of friction or road coefficient of friction and, for example, is a particularly dimension-less measure for a frictional force that can be transmitted between the wheels and the roadway, which may be transmitted proportional to a clamping force, by which the wheels are pressed against the roadway. In other words, the first step includes a so-called coefficient of friction adaptation, within the framework of which the coefficient of friction of the roadway is determined, particularly estimated.

A second step of the method illustrated in FIG. 2 by a block 70 includes adaptive torque capping, within the framework of which the basic torque of the multi-plate clutch 12 is set as a factor of the determined, particularly estimated, coefficient of friction, particularly by means of the controller, with the clutch being prestressed in the second position by the basic torque.

In FIG. 2, a block 72 illustrates that the coefficient of friction is determined as a factor of at least one of the measured speeds of the wheels. In particular, it may be provided that the coefficient of friction is determined, particularly estimated, as a factor of the measured speed of the left front wheel 26 and/or as a factor of the measured speed of the right front wheel 28 and/or as a factor of the measured speed of the left rear wheel 34 and/or as a factor of the measured speed of the right rear wheel 36. Furthermore, in FIG. 2, a block 74 illustrates that, particularly by means of respective acceleration sensors, accelerations affecting the vehicle, particularly a longitudinal acceleration affecting the vehicle and a transverse acceleration affecting the vehicle, are measured, with the coefficient of friction being determined as a factor of the measured accelerations affecting the vehicle. In so doing, it may be provided particularly that a yaw rate of the vehicle is measured, with the coefficient of friction being determined as a factor of the yaw rate.

Furthermore, in FIG. 2, a block 76 illustrates that, for example by means of a steering angle sensor, a steering angle of the vehicle is measured. In so doing, the coefficient of friction is determined, particularly estimated, as a factor of the measured steering angle. For example, the front wheels 26 and 28 and/or the rear wheels 34 and 36 are designed as steerable wheels, which may be pivoted around a steering axis in order to turn and drive the vehicle through bends this way, respectively. By pivoting the respective wheels around the steering axis, respective steering angles of the respective steerable wheels may be set, with the steering angle being measured using the steering angle sensor.

Furthermore, in FIG. 2, a block 78 illustrates a drive train model. For example, the drive train model is a computational model stored in a memory of the controller, on the basis of which a behavior, particularly an expected behavior, of the drive train 10 and thus of the vehicle as a whole is calculated by means of the controller.

The vehicle comprises at least a control element that may be operated by the driver of the vehicle, rendering the control element movable, by means of which a load of the drive motor 14 and thus the respective torque to be provided by the drive motor 14 via the output shaft may be set. For example, the control element is designed as a pedal that is also referred to as driving pedal and, for example, can be pivoted around a pivot axis in different pedal positions. In this, the driver may use his/her foot to operate the driving pedal and to thereby move it to different pedal positions, with the respective pedal position corresponding to a respective torque to be provided by the drive motor 14. For example, a pedal sensor is used in order to measure the pedal position of the drive pedal, with—as illustrated in FIG. 2 by a block 80—the measured pedal position being supplied to the drive train model. As a consequence, the expected behavior is calculated as a factor of the measured pedal position, for example. Furthermore,—as illustrated in FIG. 2 by a block 821—the respective torque provided by the drive motor 14, which is also referred to as motor torque, is determined and supplied to the drive train model such that the expected behavior is calculated and thus determined as a factor of the determined motor torque, for example. The calculated, expected behavior is incorporated in the coefficient of friction adaptation such that the coefficient of friction is determined as a factor of the calculated behavior.

The determined and, for example, estimated coefficient of friction is ultimately introduced to adaptive torque capping such that the basic torque of the multi-plate clutch 12 is set as a factor of the determined and estimated, respectively, coefficient of friction.

FIG. 1 shows that the secondary drive train is shut down in the second operating condition, because the secondary drive train, which is also referred to as secondary drive train, cannot be driven neither via the multi-plate clutch 12 by the drive motor 14 or by the front wheels 26 and 28, nor via the dog clutch 54 by the rear wheels 34 and 36. As a consequence, the drive train 10 is designed as a demand-based all-wheel system, with the option of designing the secondary drive train in a way that is particularly favorable regarding installation space, weight, and cost. As a result, the energy consumption, particularly the fuel consumption, and thus the $CO_2$ emissions of the vehicle may be held at a particularly low level. In other words, in order to reduce the consumption, the cardan shaft 38 and the crown wheel 50 may be shut down at least temporarily, particularly in the second operating condition, whereby speed- and torque-dependent losses may be held at a particularly low level. Regarding an entire lifecycle of the vehicle, the second operating condition is set substantially more often than the first operating condition. Due to the frequent second operating condition and a related lower load spectrum and torque level, respectively, the secondary drive train may be designed particularly small, whereby weight and component cost may be saved. However, the small and delicate, respectively, dimensioning of the secondary drive train increases its vibration tendency, particularly when turning, with the vibration tendency possibly resulting in acoustic impairments.

The front wheels 26 and 28 may be driven by the drive motor 14 both when the multi-plate clutch 12 and the dog clutch 54 are closed and are in their closed position and in their coupled position, respectively, and when the multi-plate clutch 12 and the dog clutch 54 are open and when the multi-plate clutch 12 is in its second position and the dog clutch 54 is in its decoupled position, respectively. As a consequence, the rear wheels 34 and 36 and the rear axis 32, respectively, may be enabled and activated, respectively, in line with the demand by closing the multi-plate clutch 12 and the dog clutch 54. Furthermore, the rear wheels 34 and 36 and the rear axis 32, respectively, may be disabled in line with the demand, i.e. deactivated, by moving the multi-plate clutch 12 to its second position and the dog clutch 54 to its decoupled position. By engaging and activating, respectively, the rear axis 32, the first operating condition (four-wheel and all-wheel drive, respectively) is set, with the second operating condition (two-wheel and front-wheel drive, respectively) being set by disabling and deactivating, respectively, the rear axis 32.

By adjusting and thus, for example, varying the basic torque of the multi-plate clutch 12, excessive vibrations of the drive train 10 and thus excessive noise may be avoided such that acoustic impairments can be avoided. As a consequence, a particularly high traveling comfort may be implemented. In the second position, the multi-plate clutch 12 may be closed as far as possible, but opened as far as necessary in order to thereby, on the one hand, avoid excessive vibrations of the drive train 10 and, on the other hand, to advantageously couple the axes to one another in order to thereby ensure high traction of the vehicle. As a consequence, a target conflict between implementing an advantageous, high traction and avoiding vibrations may be resolved or at least mitigated.

Overall, it becomes obvious that the, for example, stationary and steering-angle-based basic torque of the multi-plate clutch 12 is increased as a factor of the locally estimated coefficient of friction in order to ensure advantageous traction properties. For example, the coefficient of friction is estimated locally by comparing the model-based expectation of the vehicle behavior to the measured speeds and velocities, respectively, of the wheels, acceleration, the yaw rate, and the steering angle.

An information on the coefficient of friction may be obtained by estimating the coefficient of friction. Taking this information on the coefficient of friction as the basis, taking estimated wheel loads as the basis, and taking a torque of the drive train 10 and in the drive train 10, respectively, as the basis, an excessive torque present at the front axis 24 which is designed as primary axis may be directed proportionately to the rear axis 32 designed as secondary axis via a calculated vehicle model.

Thus, the motor torque, which is also referred to as drive torque, may primarily be applied to the front axis 24 when the roadway is dry and thus the coefficient of friction is high, for example, and warping of the drive train 10 and thus undesired acoustic feedback may be avoided. In the event of high drive torques and traction forces, respectively, or in the event of low coefficients of friction, particularly for wet roadways, the secondary axis is involved stronger accordingly in order to apply the drive torque. However, in these situations the risk of warping due to high wheelspin is significantly lower.

In this, the drive train 10 and the method are based on the idea that, for low coefficients of friction, compensation movements, as a consequence of which excessive warping in the drive train 10 may be reduced, may occur via the roadway. In the event of high coefficients of friction, such compensation movements cannot be performed via the roadway at all and to a lesser extent, respectively. Thus, in the event of high coefficients of friction, the basic torque will be reduced at the multi-plate clutch 12, for example, in order to allow for compensation movements on the drive train 10. As a consequence, excessive warping and thus excessive vibrations and undesired noise may be avoided. Such a reduction of the basic torque may be admitted for high coefficients of friction, since the axes and the wheels, respectively, due to the high coefficient of friction, are characterized by a good grip regarding the roadway. In the event of low coefficients of friction, the basic torque may be increased in order to stronger couple the axes to one another when compared to a lower basic torque. As a consequence, excessive slippage between the axes may be avoided such that a particularly advantageous traction may be ensured. Since, as a consequence of the low coefficient of friction, compensation movements between the axes and in the drive train, respectively, via the roadway are possible, there is no excessive warping and thus no undesired noise.

The invention claimed is:

1. A method for operating a first clutch at a first separation point of a drive train of a vehicle, and a second clutch at a second separation point of the drive train of the vehicle, the vehicle having the first clutch, the second clutch, a drive motor, a primary axis having first wheels drivable by the drive motor as a first axis, and a secondary axis having second wheels drivable by the drive motor via the first clutch and the second clutch as a second axis, the method comprising:

adjusting the first clutch between a closed position, wherein a first coupling torque of the first clutch is set, and at least a second position differing from the closed position, wherein a second coupling torque of the first clutch that is lower than the first coupling torque is set;

determining at least one coefficient of friction of a roadway the vehicle is located on; and as a factor of the determined coefficient of friction, adjusting the second coupling torque of the first clutch, the first clutch being prestressed in the second position by the second coupling torque;

wherein, when the first clutch is adjusted to the closed position, the second clutch is adjusted to a coupled position; and when the first clutch is adjusted to the second position, the second clutch is adjusted to a decoupled position.

2. The method according to claim 1, wherein the second coupling torque is adjusted as a factor of a steering angle of the vehicle.

3. The method according to claim 1, wherein a speed of at least one of the wheels is measured, with the coefficient of friction being determined as a factor of the measured speed.

4. The method according to claim 1, wherein the coefficient of friction is determined as a factor of a steering angle of the vehicle.

5. The method according to claim 1, wherein at least one acceleration affecting the vehicle is measured, with the coefficient of friction being determined as a factor of the measured acceleration.

6. The method according to claim 1, wherein the coefficient of friction is determined as a factor of a yaw rate of the vehicle.

7. The method according to claim 1, wherein by an electronic computing device of the vehicle, based on at least one computational model, an expected behavior of the vehicle is calculated, with the coefficient of friction being determined as a factor of calculated behavior.

8. The method according to claim 1, wherein as the clutch a frictionally engaged clutch is being used.

9. The method according to claim 8, wherein the frictionally engaged clutch is a multi-plate clutch.

* * * * *